United States Patent [19]

Jakobsen

[11] 4,427,122
[45] Jan. 24, 1984

[54] CONTAINER FOR LIQUIDS, WHICH ARE SENSITIVE TO LIGHT

[75] Inventor: Kjell M. Jakobsen, Hjallese, Denmark

[73] Assignee: Platmanufaktur A.B., Malmo, Sweden

[21] Appl. No.: 111,011

[22] Filed: Jan. 10, 1980

Related U.S. Application Data

[63] Continuation of Ser. No. 903,734, May 8, 1978, abandoned.

[30] Foreign Application Priority Data

May 13, 1977 [SE] Sweden ................................ 7705605

[51] Int. Cl.³ .............................................. B65D 1/02
[52] U.S. Cl. .................................................. 215/1 C
[58] Field of Search ............. 215/1 C, 12 R; 426/106, 426/107, 126

[56] References Cited

U.S. PATENT DOCUMENTS

| | | | |
|---|---|---|---|
| 3,415,402 | 12/1968 | Webber | 215/12 R X |
| 3,804,663 | 4/1974 | Clark | 215/1 C X |
| 3,940,001 | 2/1976 | Haefner et al. | 215/1 C |
| 4,048,361 | 9/1977 | Valyi | 215/1 C X |
| 4,051,265 | 9/1977 | Kirschenbaum et al. | 215/1 C |
| 4,079,851 | 3/1978 | Valyi | 215/1 C |
| 4,092,391 | 5/1978 | Valyi | 215/1 C X |

FOREIGN PATENT DOCUMENTS

| | | | |
|---|---|---|---|
| 581773 | 8/1959 | Canada | 426/107 |
| 1591905 | 6/1970 | France | 215/1 C |
| 886761 | 1/1962 | United Kingdom | 426/107 |

Primary Examiner—Donald F. Norton
Attorney, Agent, or Firm—Hane, Roberts, Spiecens & Cohen

[57] ABSTRACT

A container for liquids and other products comprising at least two layers of plastic material formed from a composite parison which, after heating is expanded by internal pressure into the shape of the finished container. The plastic material of the inner layer of the parison contains aluminum powder and provides protection against admission of light and comparable radiation to the material within the container. The aluminum powder also serves to heat the parison before blowing by reflecting applied shortwave radiation into the plastic material of the parison.

6 Claims, 4 Drawing Figures

CONTAINER FOR LIQUIDS, WHICH ARE SENSITIVE TO LIGHT

This is a continuation application of application Ser. No. 903,734 filed May 8, 1978, now abandoned.

FIELD OF THE INVENTION

The present invention relates to a blank and to a laminated plastic container made from the blank, one of the layers of the container being made of synthetic plastic material containing a material which prevents radiation applied to the container from reaching the interior of the latter.

PRIOR ART

In recent times a large number of packings or containers have been made of plastic material. The reason for this is that containers of this kind can be made very much lighter than containers made of sheet metal or glass. In relation to containers made of glass, containers of plastic material have, in addition, high impact strength. Containers of plastic material are often used for storing foodstuffs and similar products. Containers of plastic material are frequently used for storing juices, refreshment beverages, and similar beverages. Containers of plastic material are even used for storing beer.

At the present time containers of this kind are made predominantly of polyvinyl chloride (PVC), acrylonitrile (AN), polyethylene terephthalate (PET), and comparable materials. The reason for this is to be seen in the fact that the materials mentioned suitably combine sealing properties, strength properties, and price, while they also comply with requirements imposed in respect of purity.

When goods are stored which are sensitive to exposure to light or similar radiation, it is necessary to protect the contents of the container against incident light. Beer is an example of a product of this kind. In certain designs it has been attempted to take this requirement into account and to solve the problem entailed thereby by making the container of a plastic material of a brown color, for example, or by the addition to the plastic material of materials absorbing ultraviolet radiation. The containers have also been provided with a protective covering, for example a jacket of cardboard, in order to exclude undesirable radiation. By this means it has been found possible to achieve a certain increase in the storage life of products stored in the container, but nevertheless the storage life achieved in this manner is undesirably short.

SUMMARY OF THE INVENTION

The present invention seeks a container of plastics material which prevents radiation falling on the container from reaching the goods stored in the latter. The invention provides a container of plastic material which provides a satisfactorily long storage life for the goods contained in the container.

According to the invention, the container is made from a tubular blank which consists of two or more layers of plastic material, of which one layer, preferably the inner layer, is prepared with a pulverulent material which is impermeable to light or comparable radiation. This material may, for example, consist of a metal, for example aluminum powder. The concentration of the pulverulent material is such that the layer containing this pulverulent material in the finished container completely prevents the penetration of radiation of the character of light which falls on the layer. The two layers are joined together in such a manner that the blank and the container produced from the blank can be made by previously known and normally employed production methods.

A blank according to the invention is preferably produced by co-extrusion. The transfer moulding of the layers on a mandrel is also possible, the mandrel carrying the inner layer of, for example, a tubular blank according to the principle of the invention. In the case of co-extrusion is may, for example, be expedient to extrude continuously a tube which is thereupon cut into pieces of a suitable length. These pieces of tubing are then closed at one end, while at the same time being shaped at their other end in order to permit their fastening in a forming apparatus. In the forming apparatus the blanks are converted into finished containers.

In the closing of each individual blank, the latter is fastened over a mandrel and a holding-up means is brought down to the latter. At least that part of the blank which is to be closed is heated before and/or after being placed on the mandrel. The holding-up means and the mandrel then close the blank and the latter thus assumes the desired rounded final shape. During the closing of the blank the inner layer is brought together in such manner that in the closed portion of the blank it forms a continuous inner surface. This is achieved through the action by which the bowl-shaped holding-up means acts on the inner layer in such a manner that in the closed portion of the blank the inner layer forms a more or less homogeneous layer of material which extends from the inner surface of the blank to its outer surface. In the normal case the inner layer thus forms a layer of material which extends to the outer surface of the blank in a region around the longitudinal axis of the latter.

According to the principle of the invention, the two layers may consist of different plastic materials which at the junction between the plastic materials provide the bond which is necessary for the production of the container. In the blow-moulding of the blank to form a finished container, the blank is fastened in a blow-moulding apparatus and formed into a finished container in known manner.

The previously known technique of combining a number of layers having different strength properties, for example in respect of ability to withstand stretching forces, impacts, and shocks, in order thereby to obtain a container which is suitable for storing, for example, refreshment beverages containing carbon dioxide, is applicable within the scope of the principle of the invention.

With regard to the thickness of the layers in the blanks and in the containers, it is necessary, as is also the case with containers made of homogeneous plastic material, that the thickness be selected having regard to the mechanical stresses which the containers may be expected to undergo. In addition, requirements in respect of the ability to prevent perforation by surrounding substances and also penetration from inside and outside must obviously also determine the wall thickness. This ability is decisive for the maximum permissible storage life for products, for example liquid, in the containers.

BRIEF DESCRIPTION OF THE DRAWINGS

The invention is described more fully below in connection with the accompanying drawings, in which.

DETAILED DESCRIPTION

Figure 1:
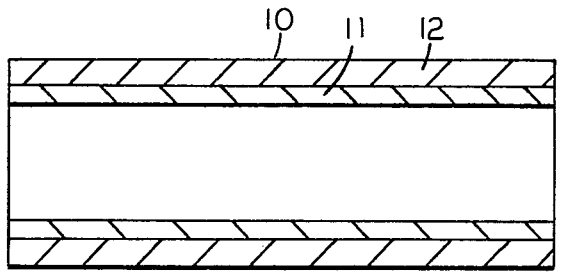
FIG. 1 is a longitudinal section through a tubular blank before the closing of the latter.
Figure 2:
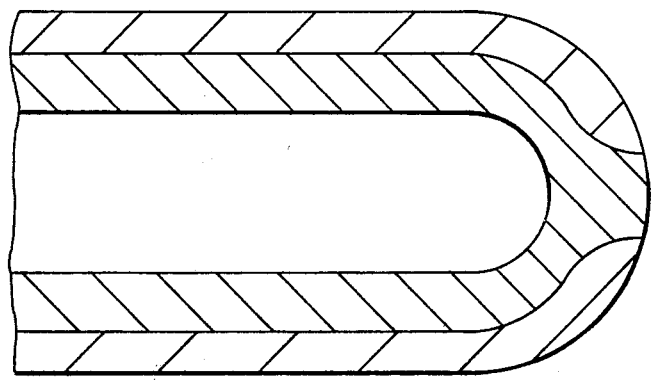
FIG. 2 shows a detail of a closed end of a blank.
Figure 3:
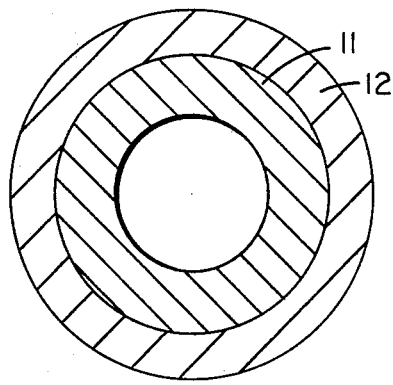
FIG. 3 is a cross-section through a tubular blank, and FIG. 4 a perspective view, partly broken away and in section of a bottle-like container.
Figure 4:
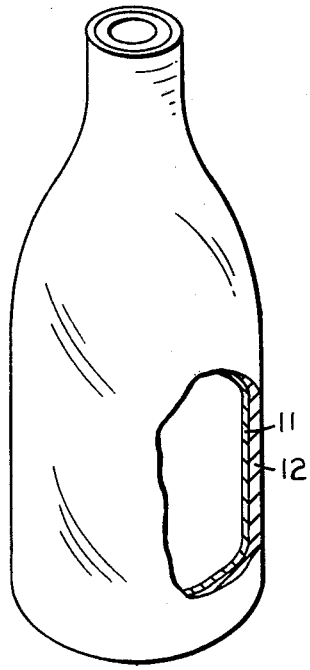

In FIGS. 1 to 3 a tubular blank 10 is shown. The blank is composed of an inner layer 11 and an outer layer 12. In FIG. 1 the blank is open at both ends. FIG. 2 shows in detail how the inner layer of the blank has pushed aside the outer layer during the closing of the blank, so that in the central portion of the closed end and the inner layer forms a layer of homogeneous plastic material which extends from the inner surface of the blank to the outer surface of the latter. From FIG. 2 it can also be seen that during the closing of the blank, the material in the inner layer is displaced in such a manner that the outer layer of plastic material is completely prevented from coming into contact with the interior of the blank.

The thickness of the layer of material in the blank is determined by the thickness required for the finished container. Above all, the latter should have adequate strength to withstand the mechanical stresses that can be expected and to take into account requirements in respect of the ability to withstand perforation of the wall of the container. The expression "perforation of the wall of the container" here relates both to penetration by the product contained in the container, that is to say the leaking of material from the interior of the container to its exterior, for example, the escape of carbon dioxide, and also perforation of the material situated outside the container, for example, the penetration of oxygen from outside the container into its interior. Similarly, the thickness of the inner layer of material should comply with the requirement of excluding undesirable radiation. For reasons of economy it is desirable to keep the thickness of the layer excluding radiation as small as possible. The necessary thickness is determined by the grain size and concentration of the material incorporated in the plastic material; usually the thickness of the layer excluding radiation may amount to from 1 to 15%, preferably from 5 to 10%, of the total wall thickness of the container. The material incorporated is in this case, from 0.5 to 2%, preferably from 1 to 1.5%, of the weight of the material of the layer excluding radiation.

The invention also provides the advantages resulting from the conversion of e.g. a tubular blank into a finished container. The tubular blanks are normally delivered in the open or closed state by the supplier of the semi-finished product. Before conversion, the blanks are heated to a temperature suitable for the purpose. For this heating, use is made of radiation heat, preferably short-wave light. If the blanks according to the invention are provided with an internal layer which reflects radiation falling on it, the heating of the plastic material in the blank will take place more quickly than in the case of transparent material. Adaptation of the wavelength to the plastic material used and also to the thickness of the layers makes it possible to optimize energy consumption and heating time.

A container according to the invention may be in the form of a barrel, a tank, a bottle, a can, or similar shape.

In cases where the wall of the container is made of plastics material of the same chemical composition, the recovered material may constitute the starting material for incorporation of the pulverulent material. In such cases it may be permissible for the layers of material to be joined together so firmly that with a view to recovery of material from the container wall they cannot be separated from one another.

In cases where recovery of the material of the container wall is desired and where this wall consists of plastic materials of different chemical compositions, it is necessary for the bond between the layers of material to make it possible for the layers to be freed from one another for the purpose of recovery. This can, for example, be achieved by making one of the layers, preferably the outer layer, of a plastic material which breaks up into smaller segments or fragments of material when, for example, a container is compressed by passing between two rollers.

I claim:

1. A container comprising at least two layers of plastic material formed from a composite parison, which after heating is expanded by internal pressure into the form of the finished container with its attendant properties, the plastic material of the inner layer of the parison containing aluminum powder for reflecting and providing protection against admission of light and comparable radiation while also serving as a means for increasing the temperature of the parison during said heating.

2. A container as claimed in claim 1 wherein the parison before blowing is heated by shortwave radiation reflected by the inner layer and resulting in increased temperature in the material surrounding the powder.

3. A container as claimed in claims 1 or 2 wherein the inner layer, which contains the reflecting powder, consists of a plastic material having different chemical properties compared with the plastic material of the outer layer to provide loose connection between the layers to allow separation of the layers and recycling of the material.

4. A container as claimed in claims 1 or 2 wherein the thickness of the inner layer containing the powder material is from 1 to 15% of the total wall thickness of the container.

5. A container as claimed in claims 1 or 2 wherein the powder material is 0.5 to 2% of the weight of material of the inner layer.

6. A container as claimed in claim 1 wherein the inner layer consists of polyethylene terephthalate.

* * * * *